United States Patent [19]
Jackel et al.

[11] Patent Number: 4,988,157
[45] Date of Patent: Jan. 29, 1991

[54] OPTICAL SWITCH USING BUBBLES

[75] Inventors: Janet L. Jackel; Walter J. Tomlinson, III, both of Holmdel, N.J.

[73] Assignee: Bell Communications Research, Inc., Livingston, N.J.

[21] Appl. No.: 490,362

[22] Filed: Mar. 8, 1990

[51] Int. Cl.[5] .......................... G02B 6/10; G02B 6/26
[52] U.S. Cl. ................. 350/96.13; 350/96.20
[58] Field of Search ................. 350/96.10–96.15, 350/96.20, 96.21, 96.29

[56] References Cited

U.S. PATENT DOCUMENTS

| | | | |
|---|---|---|---|
| 4,245,886 | 1/1981 | Kolodzey et al. | 350/96.20 |
| 4,384,761 | 5/1983 | Brady et al. | 350/96.20 |
| 4,505,539 | 3/1985 | Auracher et al. | 350/96.20 |
| 4,888,785 | 12/1989 | Lee | 372/50 |

OTHER PUBLICATIONS

Osinski et al., "Miniature Integrated Optical Beam-Splitter in AlGaAs/GaAs Ridge Waveguides," *Electronics Letters,* 1987, vol. 23, pp. 1156–1158.

Himeno et al., "High-Silica Single-Mode Optical Reflection Bending and Intersecting Waveguides," *Electronics Letters,* 1985, vol. 21, pp. 1020–1021.

Himeno et al., "Loss Measurement and Analysis of High-Silica Reflection Bending Optical Waveguides," *Journal of Lightwave Technology,* 1988, vol. 6, pp. 41–46.

*Primary Examiner*—Akm Ullah
*Attorney, Agent, or Firm*—James W. Falk; Charles S. Guenzer

[57] ABSTRACT

An optical switch, particularly useful as a bistable cross-connect matrix. Parallel input waveguides and parallel output waveguides are formed on a substrate at perpendicular angles so as to intersect. A 45° slot is formed across each intersection and is filled with a fluid having a refractive index matching the waveguide material. Electrodes are positioned adjacent the slots and are selectively activated to electrolytically convert the fluid to gaseous bubbles, thereby destroying the index matching across the slot and causing light to be reflected by the slot rather than propagating across the slot. In the presence of a catalyst, a pulse of opposite polarity or of sufficient size and of the same polarity will destroy the bubble.

14 Claims, 6 Drawing Sheets

OPTICAL SWITCH USING BUBBLES

FIELD OF THE INVENTION

The invention relates generally to optical switches. In particular, the invention relates to a bistable optical switch that can be implemented in an integrated array.

BACKGROUND OF THE INVENTION

Communication over optical fiber is gradually displacing the more traditional electronic or radio-wave transmission. Originally, optical fibers were used predominantly for high-density, long-haul applications in which data-containing electrical signals were used to modulate a laser at one end of the fiber. The light received at the other end of the fiber was detected and converted to an electrical signal in the detection process. Such a process avoided the necessity of switching an optical signal between selected fibers. Switching was predominantly done on the electrical signals derived from the optical signals. If the signal was to be retransmitted on fiber, it was again converted to optical form.

Optical fibers have many advantages over copper cable, whether it be twisted-pair copper cable for local distribution or coaxial cable for high-bandwidth transmission. In the past, however, optical fibers were too expensive to justify their substitution in local distribution networks. Now, their cost is fast approaching that of twisted-pair copper cable. It is expected that local fiber networks will become commonplace, whether the fiber is extended from the central office to the home or office or more restrictedly to a remote distribution node in the neighborhood. Local telephone fibers will carry optical optical signals that need to be switched at the central office.

Therefore, there has been an effort to develop a switch capable of directly switching an optical signal. That is, there is a desire to be able to switch the optical signal from one of M optical input fibers to any one of N optical output fibers without converting that signal to electrical form.

One part of the problem of an optically switching central office or other large scale switching node is the requirement for an optical cross-connect. In the copper-based central office of the past and the fiber-based one of the future, copper cable or fibers emanating from the home are not directly and permanently connected to the switching equipment. Instead, there is a cross-connect acting as an interface between the wire or fiber from the field and the wire or fiber within the office. For copper cable, the cross-connect is called a main distribution frame, in which central office cables are run horizontally and outside cables are run vertically. Jumper cables are installed between the horizontal and vertical sides of the frame to connect the outside copper wire to the appropriate point of the switching equipment during initial hookup of services. Any time a different equipment switching point is required, the jumper cables are manually reconnected.

The advantage of the copper jumper cable is that it provides a semi-permanent but reconfigurable connection, even if it requires manual attachment and removal. It is, however, not seen how optical fiber can be adapted to the distribution frame configuration.

It would be preferred that the optical cross-connect be electronically reconfigurable but be bistable. That is, once the cross connection is connected or disconnected, that configuration is maintained without further application of electrical power. Such bistability would allow the possibility of matrix addressing of hopefully large switching matrices. Existing mechanical optical switches are bistable but lack simple electronic control and, in any case, are too bulky, expensive and unreliable for central office use. Electro-optic devices have been proposed for optical switches. They offer the advantage of being amenable to photolithographic definition of a large number of switching elements on a single substrate. However, electro-optic devices are not bistable.

Additional desired qualities of an optical cross-connect are low loss, polarization independence, wavelength and bit-rate independence and low cross-talk between channels. To date, no technology has offered an electronic solution for the many demands of an optical cross connect.

Lee has disclosed in U.S. Pat. No. 4,888,785 an optical beam splitter. This same work has been reported by Osinski et al in a technical article entitled "Miniature integrated optical beam-splitter in AlGaAs/GaAs ridge waveguides" appearing in Electronics Letters, volume 23, 1987 at pages 1156-1158. This beam splitter consisted of two intersecting semiconductor waveguides. A slot of a precise thickness was cut through the waveguides at the intersection such that some radiation was transmitted across the slot and some was reflected at the slot interface to the intersecting waveguide.

SUMMARY OF THE INVENTION

Accordingly, it is an object of the invention to provide an optical switch in which an optical signal is switched without conversion to electrical form.

It is a further object of the invention to provide a means of semi-permanently connecting different ones of optical fibers without the need to physically act on the fibers.

The invention can be summarized as a bistable optical switch having intersecting optical waveguides formed on a substrate. The waveguide material is interrupted by a slot formed obliquely across both the intersecting at their intersection. A liquid having a refractive index matching the waveguide material can fill the slot. An electrolytic or other means associated with each intersection is selectively activated to alternately form and remove a gaseous bubble in the index-matching liquid in the slot. Thereby, when the index-matching liquid fills the respective slot, the optical signal simply passes straight through the intersection. However, when the gas bubble displaces the index-matching liquid, the index mismatch at the waveguide-slot interface causes the light signal to be reflected from the side of the slot into the intersecting waveguide. The bubble can be made bistable. That is, once created, it remains for periods of days or more.

DETAILED DESCRIPTION

According to the invention, an N×M bistable optical switch relies upon electronically formed bubbles at the intersections of N input waveguides and M output waveguides. Preferably, the bubbles are electrolytically formed at the selected intersection to establish a cross-connect at that intersection. The bubble is bistable so that it continues the connection until it is electronically removed, preferably by catalytically assisted electrolytic decomposition.

Figure 1:
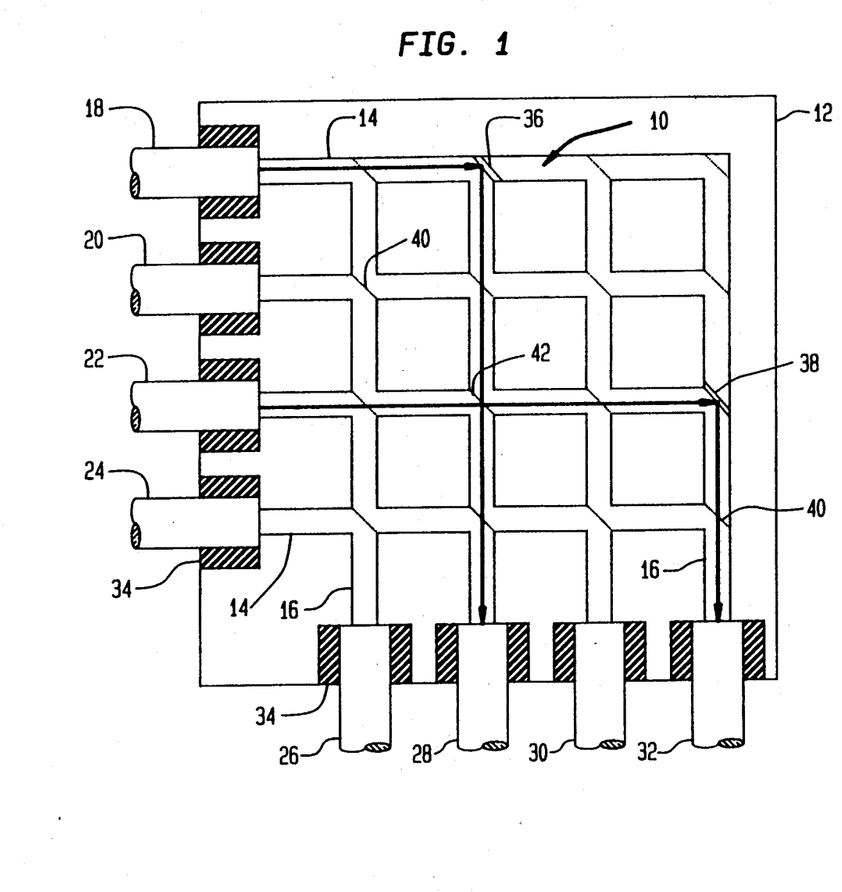
FIG. 1 is a partially plan and partially sectional view of a 4×4 optical switch of the invention.

As illustrated in the partially plan and partially sectional view of FIG. 1 for a 4×4 switch or cross-connect, a planar waveguide structure 10 is formed on a planar substrate 12. The waveguide structure 10 can be decomposed into four input waveguides 14 extending horizontally in the illustration and intersecting four output waveguides 16 extending vertically. Input optical fibers 18, 20, 22 and 24 are butt coupled to ends of the input waveguides 14. Output optical fibers 26, 28, 30 and 32 are likewise butt coupled to the output waveguides 16. Fiber guides 34 center the respective optical fibers 18 through 32 to the respective waveguides 14 and 16.

In the absence of further structure, the waveguides 14 and 16 could independently guide respective optical signals with minimum leakage or cross-talk to the other waveguides 16 and 14. However, at every intersection of an input waveguide 14 with an output waveguide 16 there is formed a slot at 45° with respect to the axes of the input and output waveguides 14 and 16. Only two empty slots 36 and 38 are illustrated. The remaining slots, indicated by dots 40, are filled with a liquid having a refractive index that is matched to that of the material of the waveguides 14 and 16. Which slots are filled and which are empty are determined by means to be described later in detail. The empty slots 36 and 38 need not be completely empty. A gaseous layer formed on the slot sidewall and thicker than a few penetration lengths of the evanescent wave in free space would suffice to provide the refractive index mismatch. For silica waveguides in the illustrated geometry, this penetration length is $\sim \lambda/2$, where $\lambda$ is the wavelength of light propagating in the waveguides 14 and 16.

If light encounters one of the slots 40 filled with the index-matching liquid, the liquid operates as a continuation of the waveguide 14 or 16 and the light continues guided in the same waveguide 14 or 16. However, if the light encounters an empty slot 36 or 38, it is at least partially reflected at right angles from an input waveguide 14 to the selected output waveguide 16. The transmission and reflection are both relatively low loss, and independent of bit-rate and polarization.

If the refractive index n of the waveguide material is at least $\sqrt{2}$, that is, 1.414, there is total internal reflection since the refractive index of the gas filling the empty slot 36 or 38 is very close to one. This condition is met by silica having a refractive index n of about 1.45. In the illustrated configuration of filled and unfilled slots, the light signal from the input fiber 18 is reflected to the output fiber 28 by the empty slot 36 while the light signal from input fiber 22 is reflected to the output fiber 32 by the empty slot 38. Different slots may be selected for being empty and thereby the optical signal on any input fiber 18, 20, 22 or 24 may be switched to any output fiber 26, 28, 30 or 32. As long as there is only a one-to-one correspondence of which input fibers 18–24 are connected to which output fibers 26–32, all four signals can be switched in parallel. There is minimal interference between signals crossing a filled slot 42.

The slots are relatively thin. It is possible to selectively form a bubble in a selected slot to thereby create an empty slot 36 or 38. Because of the small size of the slot 36 or 38 and small irregularities therein, surface tension will allow the bubble to remain in that empty slot 36 or 38 without further action. That is, the bubble is bistable. One electronic method of creating a bubble is by electrolysis of the index-matching liquid in the vicinity of the selected slot.

EXAMPLE 1

A demonstration prototype of the invention was built and tested. An unpatterned planar waveguiding stock structure was obtained from Photonic Integration Research, Inc. of Columbus, Ohio. The stock structure was originally a 4" circular wafer which was cut into squares $\sim 1$ cm on a side. As illustrated in cross-section in FIG. 2, a square consisted of a silicon substrate 50 on which had been formed a 20 μm thick buffer layer 54, a 7 μm thick guide layer 56 and a 5 μm thick cladding layer 58. All the layers 54, 56 and 58 were composed of high silica glass ($SiO_2$) having an index of refraction $n \approx 1.45$. However, the guide layer 56 additionally contained sufficient $TiO_2$ to produce a refractive index n which is slightly higher ($\Delta n \approx 0.0032$ or 0.25%) than that of the adjacent layers 54 and 58 so that light was guided in and immediately adjacent the guide layer 56. This structure would have guided light of wavelength $\lambda = 1.3$ μm in a single mode but at the tested wavelength $\lambda = 0.633$ μm the structure was multi-mode. There was no horizontally confining optical structure.

Figure 3:
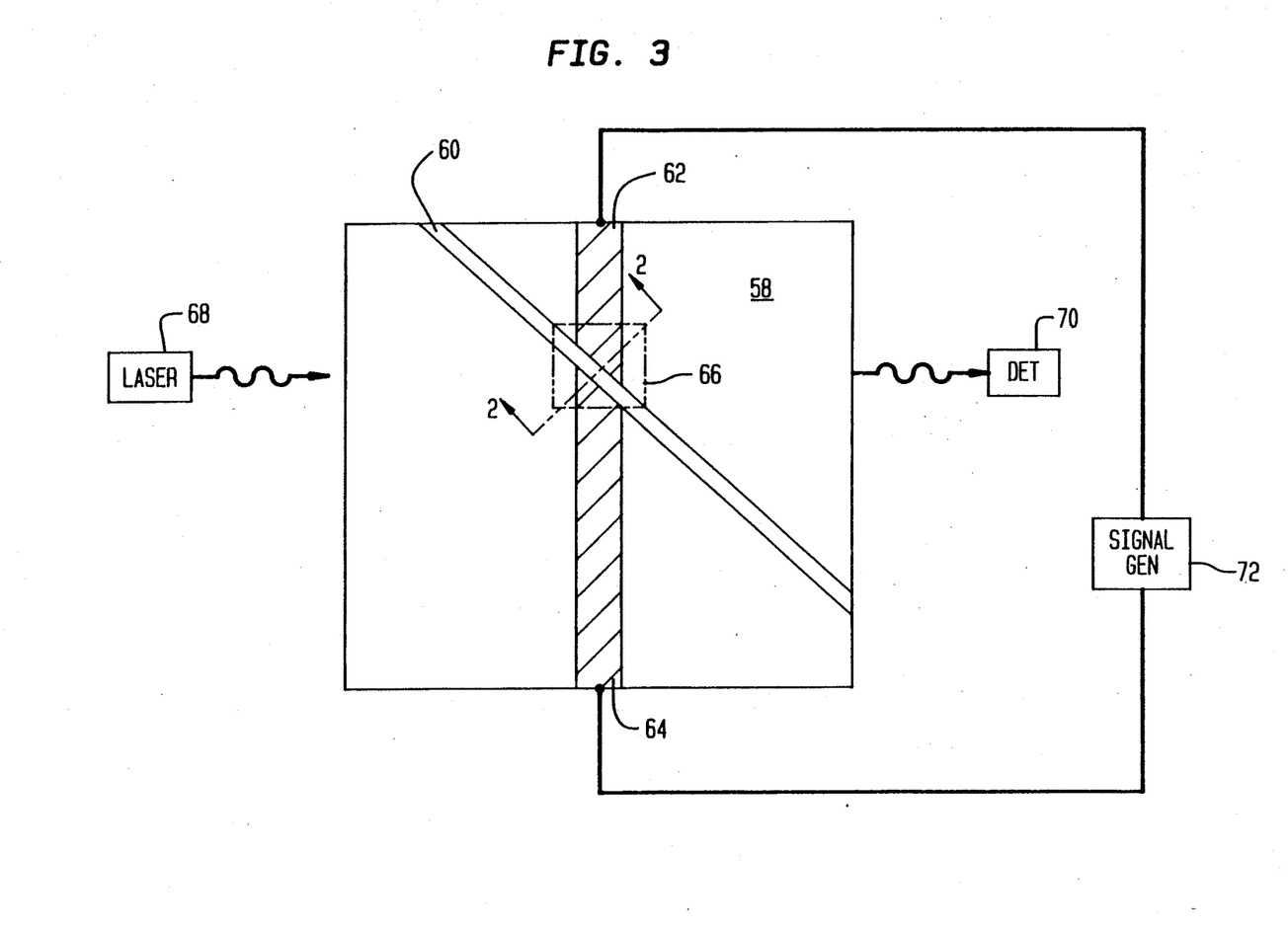
FIG. 3 is a combined plan view of the switching cell of FIG. 2 and block diagram of associated circuitry.

As further illustrated in the plan view and block diagram of FIG. 3, a 5 mil (125 μm) saw was used to cut a slot 60 extending downward from the surface through a substantial portion of the buffer layer 54 and extending axially at 45° to the intended optical axis. Then, a first electrode 62 and a second electrode 64 were simultaneously deposited by a electron-beam evaporation process standard in semiconductor fabrication. Preferably, the electrodes 62 and 64 additionally perform as catalysts so that the electrode material was Pt on an adhesion layer of Ti. The electrode materials were were deposited to a width of $\sim 1$ mm and thicknesses of 50 nm for the Ti and 100 nm for the Pt. The photolithographic mask had a single stripe for both electrodes 62 and 64 but the deposition of electrode material into the slot 60 had no deleterious effect. In a separate experiment, the electrodes 62 and 64 were offset from each other along the slot 60 without any significant changes observed.

Water was mixed with a few drops of acetic acid or sulfuric acid or with $LiNO_3$ electrolyte so that the water was conducting. This water was filled into the slot 60. Over an area of the slot 60 intended to simulate an intersection (a switching cell) of the cross-connect, there was placed a $\sim 0.16$ mm thick glass cover slip 66 of ~0.5 cm on a side. Thereby, the liquid initially filled the slot 60 in the area of the switching cell and contacted the electrodes 62 and 64. Further, the portions of the slot 60 away from the switching cell acted as reservoirs for excess fluid. When an electrical current is passed through the water between the electrodes 62 and 64, some of the water is decomposed into hydrogen and oxygen gases. The hydrogen forms a bubble at the cathode and the oxygen forms a corresponding bubble at the anode.

To test the switch cell, a He/Ne laser 68 was aligned with an optical axis passing through the switch cell in the guide layer 56 and aligned at 45° to the slot 60. An optical detector 70 was likewise aligned with this optical axis. A signal generator 72 had its leads connected to the electrodes 62 and 64.

Figure 4:
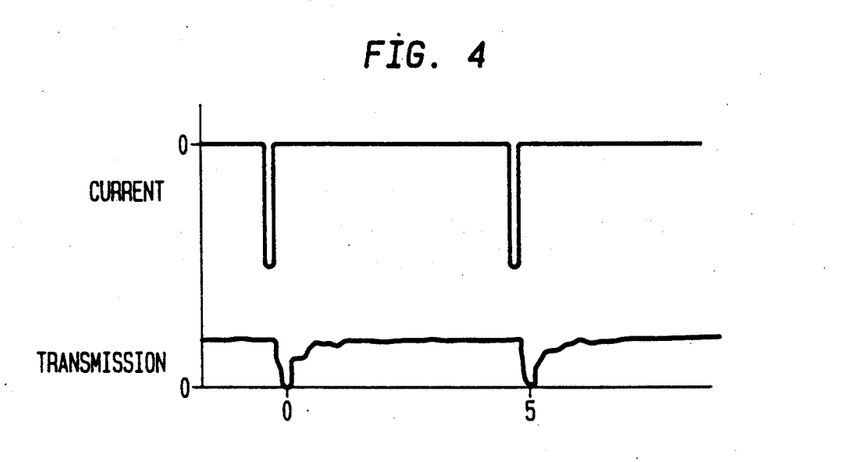
FIGS. 4 and 5 are plots of the current applied to the electrodes and the resultant optical transmission as a function of time for an example of the invention. Time is expressed in units of seconds.

A voltage pulse of 7 V of a first polarity was applied to the electrodes 62 and 64. As illustrated in the graphs of current and transmitted light intensity vs. time of FIG. 4, the optical transmission quickly dropped to zero in a time of ~20 ms. The voltage pulse was large enough so that the $H_2$ and $O_2$ bubbles merged and, being catalyzed by the Pt, reformed liquid water. This recombination required about 1.5 s, during which time the transmission was returning to its original value. When the pulse was repeated, the same optical response was observed.

Figure 5:
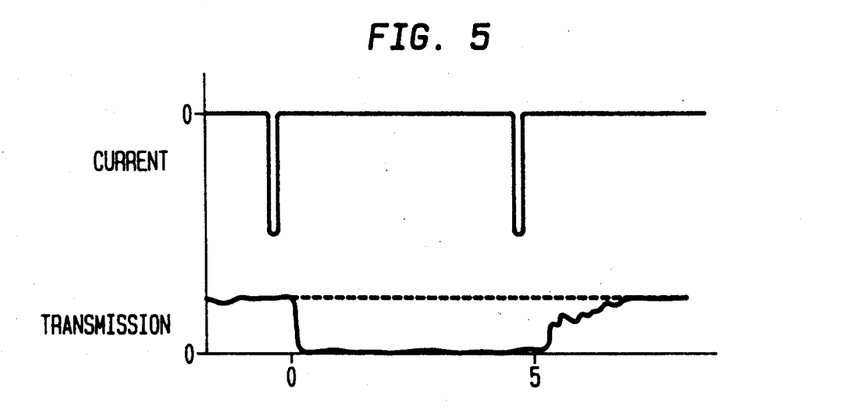

As illustrated in the similar graphs of FIG. 5, when there was applied a smaller first voltage pulse than would merge the two bubbles, the optical transmission remained at a near-zero value until a second pulse merged the bubbles. Experiments were performed in which the second pulse was not applied. In these cases, the optical transmission remained at near zero for periods varying from 8 to 12 hours. That is, the bubble was stable within the slot 60 without the application of additional electrical signal. It is believed the stability period was limited by evaporation from the uncovered slots. In separate experiments, bubbles were observed to persist in a sealed slot for periods of four months.

In these experiments, an $O_2$ bubble was being created at the anode and an $H_2$ bubble at the cathode. The presence of the bubble caused total internal reflection at the waveguide/bubble interface. When the total pulse size was large enough so that the two bubbles merged, the gases quickly mixed and were then catalyzed by the Pt electrodes 62 and 64 into liquid $H_2O$. The destruction of the bubble permitted the return of the index-matching water to the interface of the slot and the waveguide, thereby again causing transmission. In the illustrated configuration, the polarity of the pulses was relatively unimportant beyond the fact that the hydrogen bubble was twice as large as the oxygen one.

The switching operation illustrated in FIG. 5 used two pulses of the same polarity. Similar switching could be achieved, with perhaps faster transients, by using a first pulse of a first polarity and only sufficient duration of stop transmission (cause reflection). To remove the bubbles, a second pulse of opposite polarity and the same magnitude (of time-integrated current) is applied. That is, the roles of anodes and cathodes are reversed between the bubble creation and bubble removal stages. Thereby, the two bubbles never merge but $H_2$ and $O_2$ are generated into each bubble but by pulses of different polarity.

The switch cell of Example 1 could be used as a 1×2 switch with the two outputs being in the straight-ahead direction and the perpendicular direction with respect to the input.

EXAMPLE 2

In a second experiment, a switch cell was fabricated similar to that of the first example with the exception that the electrodes 62 and 64 were made of Ti/Au. Therefore, they contained no catalyst.

When the switch cell was tested, an initial unipolar pulse produced the same reduction in optical transmission as in FIG. 5 for the first example. However, a second pulse of reverse polarity had no effect on the optical transmission. Similarly, a unipolar pulse of sufficient size to merge the bubbles did not return the optical transmission to its initial value. In the absence of a catalyst, the $H_2$ and $O_2$ gases were not quickly reacting to form $H_2O$.

The relatively pure water used in the tests had an index of refraction of ~1.33, which is not well matched to $n=1.45$ for silica. Any mismatch introduces loss and cross-talk at a transmitting cell. The mismatch could be reduced by mixing water with another higher-index liquid. For example, glycerol has an refractive index $n \approx 1.475$. Alternatively, solids can be dissolved in a liquid. For example, a 60% solution of sucrose in water has $n \approx 1.45$. It is even possible to suspend small particles of high index in the liquid. Their small size limits optical scattering and Brownian motion keeps them suspended indefinitely.

Figure 2:
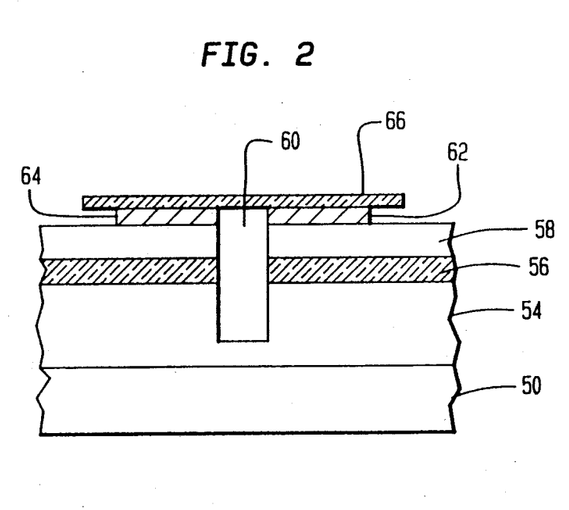
FIG. 2 is a cross-section of a switching cell in an example of the invention. This view is taken along section line 2—2 of FIG. 3.

An optical cross-connect would preferably be improved over the test structure of FIGS. 2 and 3. The sawing was clearly non-optimal. It produced a slot 60 of about 150 μm width, much wider than the 7 to 10 μm wide slot envisioned for the cross-connect. With the narrower slot, the bubbles could be smaller so that the catalyzed reaction could be completed more quickly than the observed 1.5 s. Furthermore, the sides of the sawn slot 60 were rougher and less vertical than desired, creating losses for both transmission and reflection. It would be preferred to form such narrow slots with reactive ion etching (RIE). Other catalysts such as palladium could be used. Although it appears advantageous to use catalytic electrodes, the catalyst may be disposed apart from the electrodes. The catalytically limited recombination could be speeded by increasing the area of the catalyst exposed to the bubble. Thus, it would be preferable to place a layer of catalyst at the bottom of the slot where its surface area rather than its cross-section is exposed.

Figure 6:
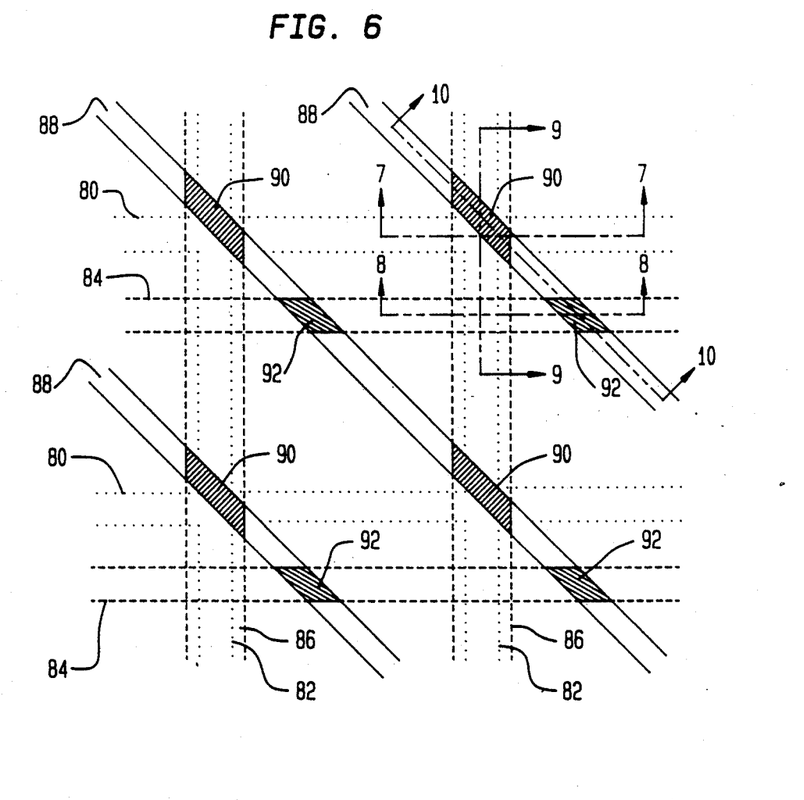
FIG. 6 is a plan view of part of another embodiment of the optical switch matrix of the invention.

A plan view of a preferred embodiment of a matrix switch incorporating many of the above improvements is shown in the plan view of FIG. 6. A buried network of perpendicular input waveguides 80 and output waveguides 82, both shown by dotted lines, are formed beneath the surface in a buried structure to be explained more completely latter. Also formed in this buried structure are perpendicular anode leads 84 and cathode leads 86, both shown by dashed lines. Preferably both anode and cathode leads 84 and 86 are formed of a catalytic conductor such as platinum or palladium. Continuous slots 88 are formed at 45° so as to split each intersection of an input waveguide 80 and an output waveguide 82. The slots 88 are of the order of 8 μm wide and extend downward to expose the cathode leads 86 as cathodes 90 and to expose the anode leads 84 as anodes 92. The slots 88 are aligned so that the side facing the inputs (the left in FIG. 6) and the outputs (the bottom in FIG. 6) bisect the intersection of an input waveguide 80 and an output waveguide 82.

Electrolytic and index-matching fluid is introduced into the slots 88 so as to nearly fill them. It is assumed that the index-matching fluid is predominantly water. As long as the index-matching fluid fills the portions of the slots 88 on top of the cathodes 90, light proceeds across the intersections of the input and output waveguides 80 and 82. However, if a bubble fills a significant portion of the slot 88 over a selected cathode 90, the optical signal on the input waveguide 80 over that cathode 90 is reflected at the slot 88 to the output waveguide 82 over that cathode 90.

The bubble is created electrolytically. Power is applied between the cathode lead 86 of which that cathode 90 is formed and the anode lead 84 of which the nearest anode 92 is formed. This selection of two leads 84 and 86 amounts to matrix addressing of the array. The terminology assumes that a positive voltage is applied to the cathodes 90 and negative voltage to the anodes 92; however, the voltages can be reversed with the understanding that the locations of the $H_2$ and $O_2$ bubbles will be reversed. Nonetheless, the electrolytically created $H_2$ bubble will be twice as big.

The bubble can be removed and reflection returned to transmission by either applying an equal-sized pulse of opposite polarity or applying another pulse of the same polarity and sufficient size that the bubbles over the cathode 90 and anode 92 merge. Thereupon, in either case, the Pt in the cathode 90 and anode 92 catalyzes the $H_2$ and $O_2$ gases to reform liquid water.

Figure 7:
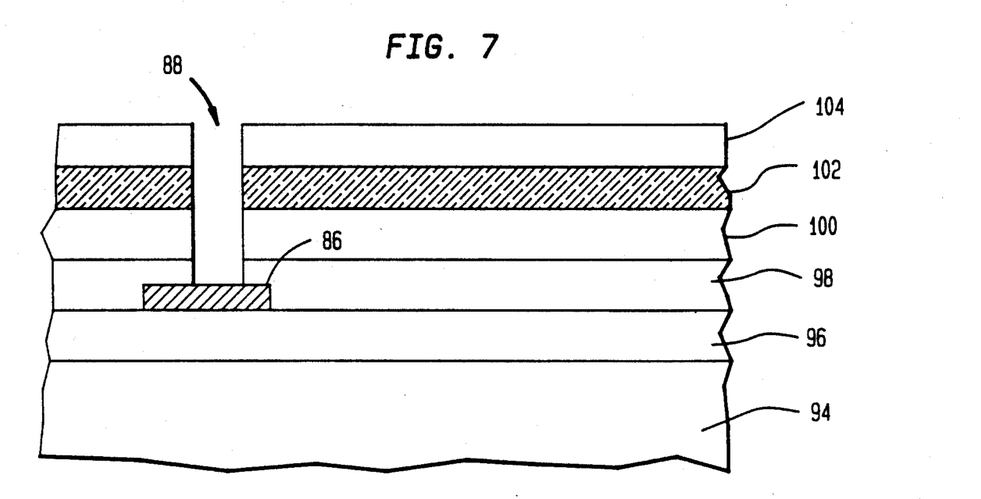
FIGS. 7 through 10 are cross-sections of the optical switch matrix of FIG. 6 taken along respective sectional lines 7—7, 8—8, 9—9 and 10—10 of FIG. 6.

The fabrication of the switch will be explained with references to the cross-sections shown in FIGS. 7 through 10. FIG. 7 is a cross-section taken along the medial line of the input waveguide 80, FIG. 8 is a cross-section taken along the medial line of the anode lead 84, FIG. 9 is a cross-section taken along the medial line of the output waveguide 82 and the cathode lead 86 and FIG. 10 is a cross-section taken along the medial line of the 45° slot 88.

Figure 8:
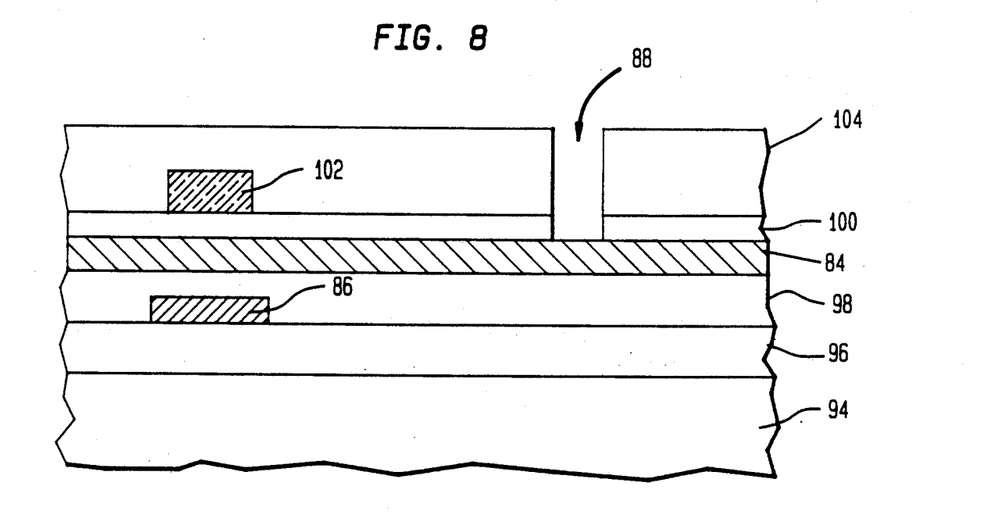
Figure 9:
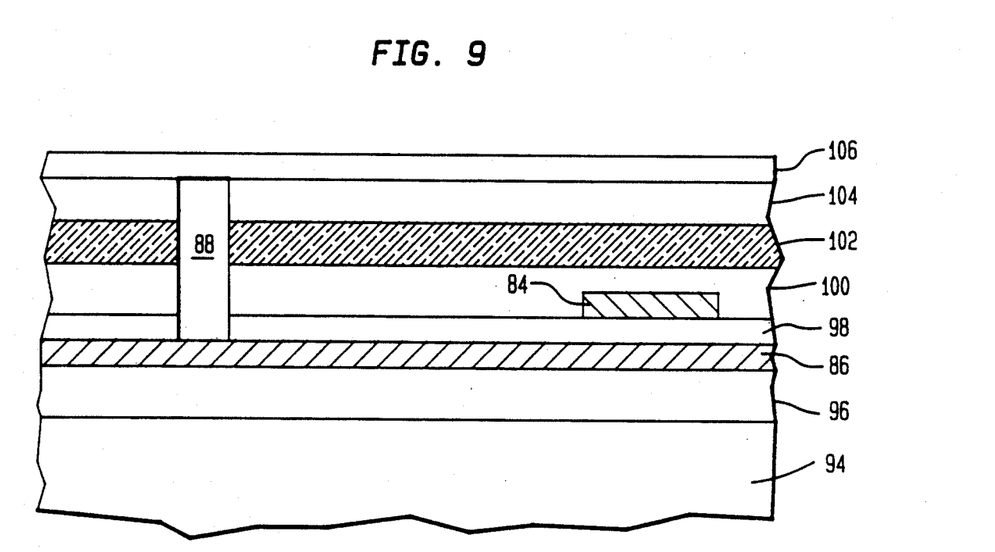
Figure 10:
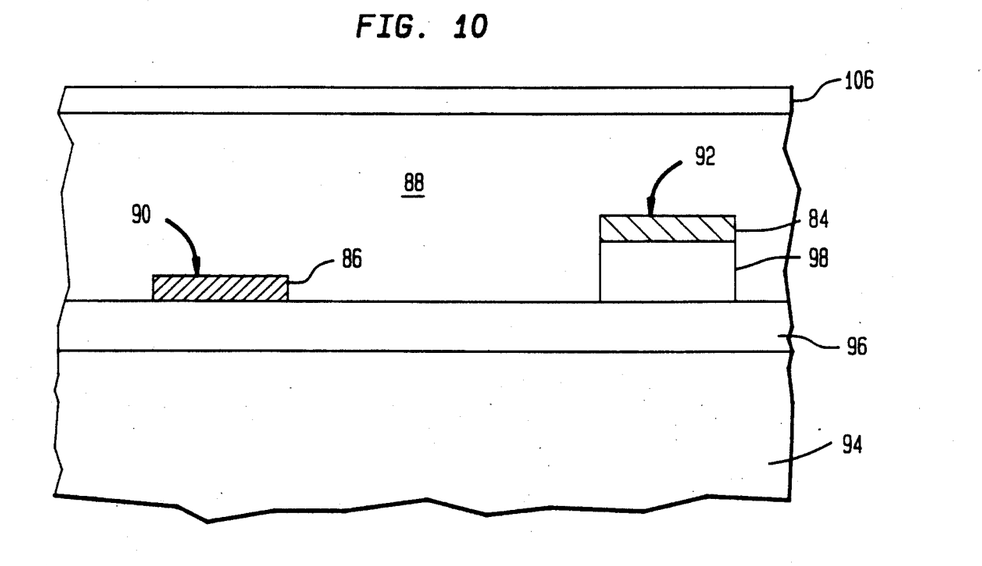

As shown best in the cross-sections of FIGS. 8 and 9, there is deposited on a silicon substrate 94 a 2 to 3 $\mu m$ $SiO_2$ buffer layer 96. As is well known, the process for forming $SiO_2$ includes the co-deposition of $B_2O_3$ or in some cases phosphorous. On the buffer layer 96 are deposited and patterned the cathode leads 86 which will form the cathodes 90 in the eventually formed slots 88. The cathode lead layer may be a layer of titanium (for adhesion) followed by a layer of catalytic platinum. Over the cathode leads 86 is deposited a 200 nm layer 98 of $SiO_2$ which acts both as a lower cladding layer and as insulation between the anode and cathode leads 84 and 86. No patterning is yet performed of the $SiO_2$ layer 98. The figures assume planarization whenever a layer is formed over a previously defined feature. Then, there are deposited layers of Ti and Pt, which are patterned into the anode leads 84, over which is deposited a remaining lower cladding layer 100 of $SiO_2$.

There then is grown a ~7 $\mu m$ thick guiding layer of $SiO_2$ doped with Ge or Ti to slightly increase its refractive index n. This layer is masked and etched to form channel guides 102 which correspond to the input and output waveguides 80 and 82. The channel guide 102 corresponding to one of the output waveguides 82 overlies and follows the cathode lead 86. In a last growth step, there is grown an upper cladding layer 104 of ~5 $\mu m$ of $SiO_2$.

This generally planar structure is then masked and etched by reactive ion etching (RIE) to form the ~8 $\mu m$ slots 88. The etching continues in the $SiO_2$ down to the buffer layer 96. However, the metallic anode and cathode leads 84 and 86 act as at least partial etch stops, as illustrated in FIG. 10, so as to expose the cathode 90 and anode 92. In a commercial device, a cover 106, illustrated only in FIGS. 9 and 10, would be placed on top bridging the slots 88.

The procedures described above are generally conventional in semiconductor and opto-electronic fabrication. The fabrication of this type of planar waveguide structure has been disclosed by Himeno et al in two technical articles entitled "High-silica single-mode optical reflection bending and intersecting waveguides" appearing in Electronic Letters, volume 21, 1985 at pages 1020–1021 and "Loss measurement and analysis of high-silica reflection bending optical waveguides" in Journal of Lightwave Technology, volume 6, 1988 at pages 41–46. They also disclose the reflection of light at an interface somewhat similar to the interface between the waveguide and empty slot of the invention. The previously cited disclosures of Lee and of Osinski et al describe an alternative fabrication process.

Figure 11:
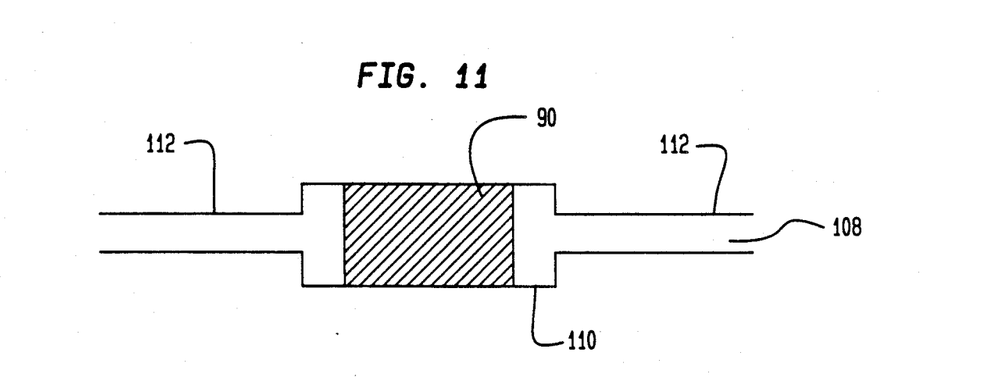
FIG. 11 is a plan view of a shaped slot, an improvement of the invention.

The bubble position can be further controlled by shaping a slot 108, as illustrated in the plan view of FIG. 11. The shaping is easily accomplished by reactive ion etching. The slot 108 has a wider portion 110, at the bottom of which the cathode 90 is exposed. The wider portion 110 has a width of ~7 $\mu m$ dictated by the properties of the bubble/waveguide interface and a length of ~20–30 $\mu m$. On longitudinal ends of the wider portion 110 are narrower portions 112 only wide enough to allow low-resistance fluid flow. A 1:2 ratio of the widths of the narrower and wider portions 112 and 110 suffices to prevent bubble migration. The anode 92 would be located a substantial distance along one of the narrower portions 112 relative to the width of the narrower portions 112. When a bubble is formed adjacent the cathode 90 within the wider portion 110, surface tension will prevent the bubble from migrating into the narrower portions 112 of the slot 108.

Figure 12:
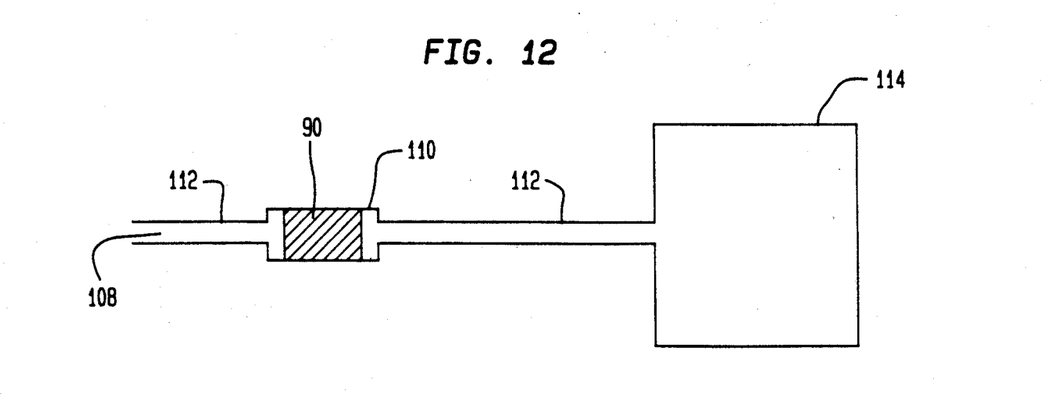
FIG. 12 is a plan view of a reservoir connected to the slot, another improvement of the invention.

Water, like most fluids, is virtually incompressible. Further, when water is electrolyzed into gaseous hydrogen and oxygen, the volume of the resultant bubbles is substantially larger than the volume of the electrolyzed water. Thus, when bubbles are created within the water at the anode and cathode, the combined volume of water and bubbles is increased. Similarly, the combined volume is decreased upon destruction of the bubbles. Accordingly, as illustrated in plan view in FIG. 12, it is preferred that the wider portion 110 of the slot 108 be connected to a large expansion reservoir 114 for the water. The connecting part of the narrower portion 112 of the slot 108 would be ~50–100 $\mu m$ long and the lateral dimensions of the reservoir 114 would be ~100 $\mu m$. The reservoir 114 could extend into the overlying cover 106. A vent hole in the cover 106 over the reservoir 114 would assure pressure equalization. These reservoirs 114 would need to be distributed along each of the slots 88 within the matrix of FIG. 6. Such reservoirs 114 would further accomodate thermal expansion of the water or other fluid.

The invention thus provides a simple, inexpensive and bistable optical switch. Even though the switching times have not yet been optimized, they are clearly adequate for a cross-connect. The fabrication techniques required to build such a switch are well known and are amenable to building large switching arrays. Cross-talk and transmission and reflection losses exist but appear to be acceptable for many applications.

What is claimed is:

1. An optical switch, comprising:
   a first optical waveguide formed on a surface of a substrate;
   a second optical waveguide formed on said surface of said substrate and intersecting said first waveguide at an intersection;
   a slot formed across said first and second waveguide at said intersection;
   a liquid selectively disposed in said slot; and
   means for selectively forming a gaseous bubble in said liquid in at least a portion of said slot adjacent said first and second waveguides at said intersection;
   wherein said forming means comprise electrolytic forming means for electrolyzing said liquid to create said bubble at said intersection;
   whereby a light signal propagating on said first optical waveguide selectively continues in said first optical waveguide across said intersection when said bubble is not formed at said intersection but is selectively switched to said second optical waveguide when said bubble is formed at said intersection.

2. An optical switch as recited in claim 1, further comprising a catalyst disposed adjacent said portion of said slot for catalyzing components of said bubble.

3. An optical switch as recited in claim 1, wherein said forming means creates said bubbles in a region intercepting an optical path of said first optical waveguide.

4. An optical switching matrix, comprising:
   a plurality of first waveguides formed in a substrate and extending along a first direction;
   a plurality of second waveguides formed in said substrate, extending along a second direction non-parallel to said first direction and each of said second waveguides serially intersecting all of said first waveguides at respective intersections;
   slots formed across said first and second waveguides at at least some of said intersections and capable of containing a fluid movably disposed in said slots; and
   electrolytic forming means for electrolyzing said liquid to selectively form a gaseous bubble in said liquid in said slots adjacent to a selected one of said intersections
   whereby said bubble being formed at said selected intersection causes a light signal propagating on a selected one of said first waveguides to be selectively 5. An optical switch matrix as recited in claim 4, further comprising a catalyst disposed adjacent to said slots for catalyzing components of said bubble.

6. An optical switch matrix as recited in claim 4, wherein said electrolytic forming means comprises electrodes disposed adjacent to said slots and electrical means for applying power of a selected polarity to selected pairs of said electrodes.

7. An optical switch matrix as recited in claim 6, further comprising a catalyst disposed adjacent said slots for catalyzing components of said bubble.

8. An optical switch matrix as recited in claim 7, wherein at least one of said electrodes comprises said catalyst.

9. An optical switch matrix as recited in claim 8, wherein said slots are formed of wider portions passing through said intersections and having said catalyst comprising electrode formed on a bottom surface thereof and narrower portions extending between neighboring ones of said intersections.

10. An optical switch matrix as recited in claim 9, further comprising reservoirs for said liquid connected to said narrower portions of said slots.

11. An optical switch matrix as recited in claim 4, wherein said liquid has an index of refraction substantially matching an index of refraction of said first and second waveguides.

12. An optical switch matrix as recited in claim 4, wherein said electrolytic forming means forms said bubble in a region intercepting an optical path of said selected one of said first waveguides.

13. An optical switch, comprising:
    optical waveguiding means formed in an intersecting structure;
    apertures formed in said structure at respective intersections of portions of said structure;
    a fluid movably disposed in said apertures; and
    means for electrolyzing said fluid adjacent to said intersections to create a bubble in said fluid;
    whereby creation or destruction of said bubble adjacent to at least one of said intersections causes light signals to be selectively switched between portions of said optical waveguiding means.

14. An optical switch as recited in claim 13, wherein said bubble is created within an optical path of said optical waveguiding means.

* * * * *

UNITED STATES PATENT AND TRADEMARK OFFICE
CERTIFICATE OF CORRECTION

PATENT NO. : 4,988,157

DATED : January 29, 1991

INVENTOR(S) : Janet L. Jackel and Walter J. Tomlinson, III

It is certified that error appears in the above-identified patent and that said Letters Patent is hereby corrected as shown below:

Column 2, line 41, "intersecting at" should read --intersecting waveguides at--.
Column 5, line 58, "of stop" should read --to stop--.
Column 8, line 62, "accomodate" should read --accommodate--.
Column 9, line 11, "waveguide" should read --waveguides--.
Column 10, line 4, "selectively" should read --selectively switched to a selected one of said second waveguides.--.

Signed and Sealed this

Twenty-first Day of July, 1992

*Attest:*

DOUGLAS B. COMER

*Attesting Officer*    *Acting Commissioner of Patents and Trademarks*